Figure 4:
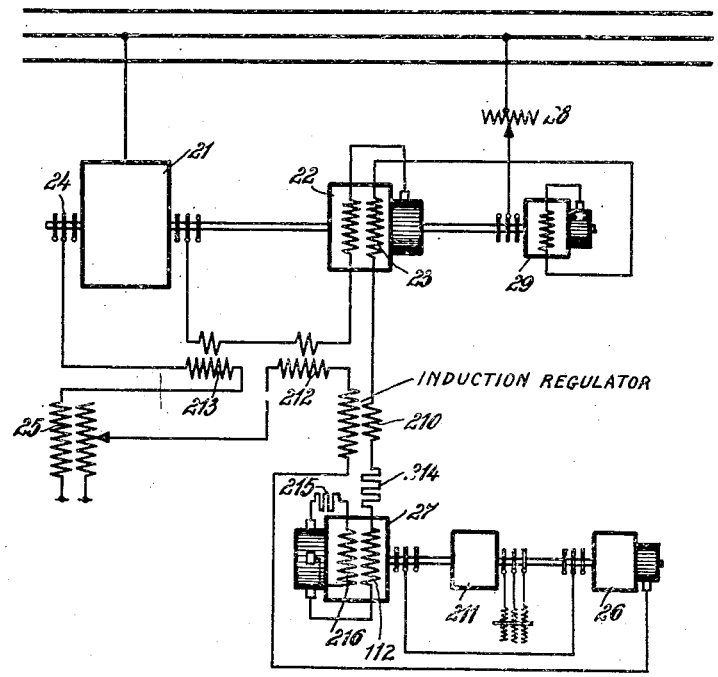

Oct. 21, 1930.    M. LIWSCHITZ    1,778,832
ARRANGEMENT FOR INTRODUCING VOLTAGES INTO ALTERNATING CURRENT CIRCUITS
Filed May 3, 1928    3 Sheets-Sheet 1
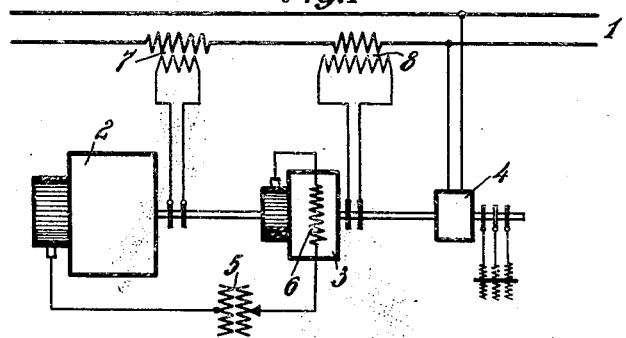
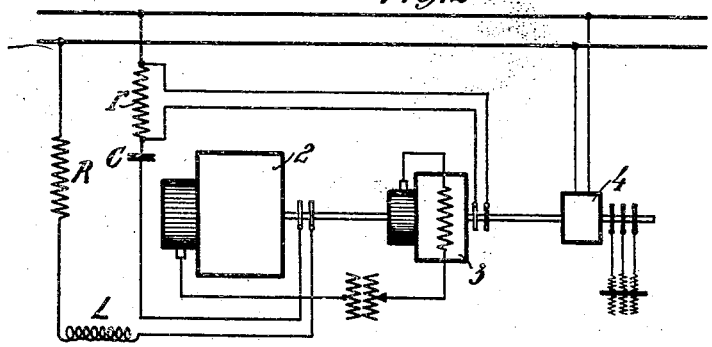
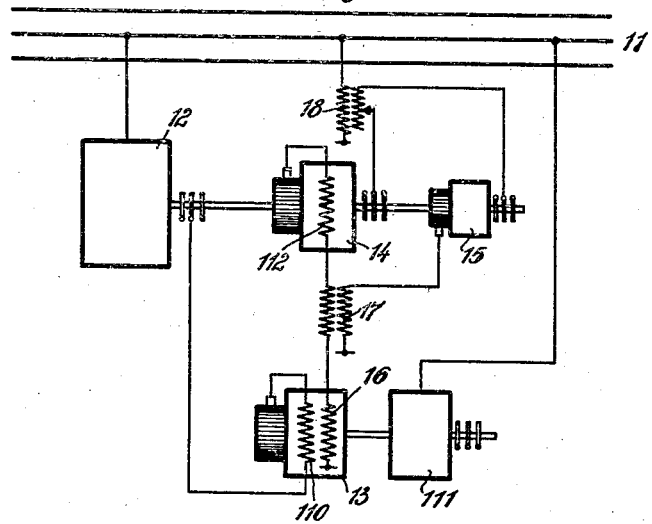
INVENTOR
Michael Liwschitz
BY
ATTORNEY

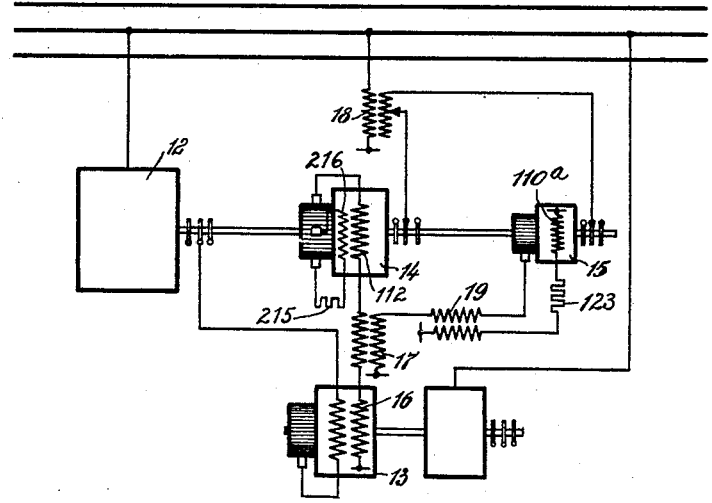
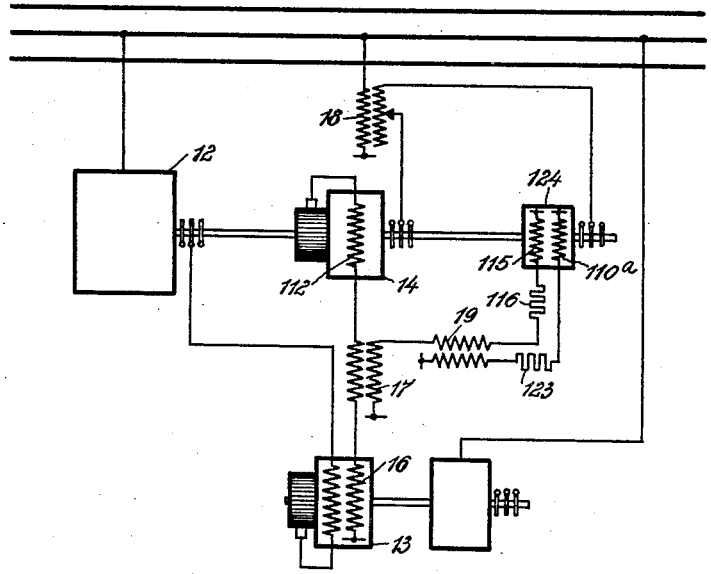

Patented Oct. 21, 1930

1,778,832

UNITED STATES PATENT OFFICE

MICHAEL LIWSCHITZ, OF BERLIN-CHARLOTTENBURG, GERMANY, ASSIGNOR TO WESTINGHOUSE ELECTRIC & MANUFACTURING COMPANY, A CORPORATION OF PENNSYLVANIA

ARRANGEMENT FOR INTRODUCING VOLTAGES INTO ALTERNATING-CURRENT CIRCUITS

Application filed May 3, 1928, Serial No. 274,783, and in Germany May 4, 1927.

My invention relates to an arrangement for introducing voltages into alternating current circuits, in particular into alternating current circuits of variable frequency. One object of my invention is to introduce voltages into alternating current circuits, which are proportional either to the current only or to the current and the frequency in the alternating current circuit.

A further object of my invention is to produce a three-phase regulator unit for a cascaded variable-speed induction-motor set, characterized by having a cascaded commutator machine which is provided with a stator exciter winding, and a slip frequency exciting means therefor including a source of voltage such as to neutralize the inductive voltage drop of the exciter winding at all times.

A still further object of my invention is to provide a three-phase regulator unit of the class just mentioned, in which the aforesaid neutralizing voltages are proportional to the square of the slip, so that they neutralize the voltages which interfere with the regulation process, which are likewise proportional to the square of the slip.

Several embodiments of my invention are illustrated in the drawings affixed hereto and forming part of my specification, wherein Fig. 1 is a diagrammatic view of circuits and apparatus embodying my invention in a system in which an alternating current line is regulated by apparatus whereby voltages are introduced proportional to the current of the line, Fig. 2 is a similar view showing a modified system in which the damping of an oscillating circuit is reduced or altered by the introduction of a voltage according to my invention, Fig. 3 is a similar view showing my novel three-phase regulator set applied to the exciting circuit of the cascaded commutator machine of a doubly-fed induction-motor set, and Figs. 4, 5, 6 and 7 are similar views showing modifications of the system shown in Fig. 3.

Referring to Fig. 1, 1 is an alternating current transmission line, the ohmic or inductive voltage drop of which is to be compensated by an additional voltage. For this purpose there are provided two rotating frequency converters or changers 2 and 3, which are coupled with each other and are driven by an asynchronous motor 4 fed from the mains. The frequency converters are connected in series through the commutator sides and through a transformer 5 with tap changing mechanism, a single-line diagram being indicated in the drawing, it being understood, of course, that a plurality of brushes are used on the commutator. One of the frequency converters, as the converter 3, is equipped with a compensating winding or polyphase neutralizing winding 6 which ensures that the output of the frequency converter 3 is not transferred to the exciter circuit of the second frequency converter 2, but is transmitted in the form of mechanical torque to or from the driving machine 4.

The slip ring sides of the two frequency converters are connected with two current transformers 7 and 8 connected in the alternating current system 1. Owing to the compensating winding 6, the line 1 is regulated by the introduction of a voltage which is proportional to the current in the line. In order to reduce the output of the driving motor 4 to a minimum value which suffices for covering the no-load losses, the brushes of the frequency converters are preferably set in such position that the voltage introduced into the line 1 by the frequency converter 2 has a phase displacement of 90° with respect to the current of the line, so that mechanical output is not transferred from the frequency converter 3 to the asynchronous motor 4 or taken up from it, as only wattless output is transmitted to it from the frequency converter 2. As will be explained more fully hereinafter in connection with the current transformer 17 of Fig. 3 and the current transformers 210, 212 and 213 of Fig. 4, the exciting-circuit current-transformer 8 of Fig. 1 is also designed as a reactionless transformer.

While I have described a transformer 8 for supplying a control-voltage of the same frequency as the line 1 to the frequency converter 3, so that the two frequency converters 2 and 3 thus have the same frequency-changing ratios and are thus conveniently mounted on the same shaft, my invention, in its broadest aspect, also contemplates a control-voltage of a different frequency, in which case the mechanical coupling of the two frequency converters would not necessarily be desired.

The property of introducing in an alternating current circuit, a voltage which is proportional to the current in this circuit, or the adjustability of the phase of this voltage also, theoretically offers the possibility of increasing or reducing the ohmic, the inductive or the capacitive resistance (the impedance) of the alternating current circuit in any manner desired, by introducing a voltage having a phase angle of 0 or 180° with respect to either the ohmic voltage drop or with respect to the inductive or capacitive voltages in this circuit, or having both components. The magnitudes of the voltages introduced in this way are such as to reduce the ohmic resistance of an alternating current circuit to any desired extent down to zero or even to convert it into a negative ohmic resistance or to increase, the ohmic resistance in any desired manner without involving a corresponding increase of the losses, since the energy is not converted into heat, but is recovered in the driving machine. It is thus possible, by my improved arrangement, to improve the condition of a transmission line with respect to resonance, because I can increase its damping, by increasing its ohmic resistance, or I can change the resonance frequency so that it will not coincide with an important harmonic frequency, by controlling the inductive or capacitive voltages, all of this being accomplished by the proper choice of transformer ratios and commutator-brush setting, when the machines are assembled.

Fig. 2 of the drawings shows an embodiment of my invention in which the two frequency converters 2 and 3 serve to influence or control the value of the ohmic and inductive resistances in a local alternating current circuit having the self-induction L, the capacity C and the ohmic resistance R. The frequency converter 3 is for this purpose connected across an ohmic resistance $r$, which is connected in the aforesaid local circuit, as shown in Fig. 2, so that the frequency converter 3 is excited with a voltage proportional to the current. According to the phase of the voltage given off by the frequency converter 2 the inductance L or the ohmic resistance R of the circuit may then be acted upon, according to the phase angles of the brushes on the commutators.

The connection of the frequency converter 3 to an ohmic resistance connected in the circuit has the advantage that the magnitude of the voltage supplied by the two frequency converters is not influenced by the frequency of the alternating current circuit as is the case when the electric coupling is made across an inductance device or current transformer. This fact may be desirable when the alternating current circuit to be regulated is of variable frequency, as for instance when it is the secondary circuit of an asynchronous machine or when it is the exciting circuit of a cascaded commutator machine of a doubly-fed induction-motor set, as will subsequently be described. If, on the other hand, a current transformer is used instead of the ohmic resistance $r$ of the Fig. 2, in a variable frequency alternating current circuit, the voltage introduced by the regulating set 2, 3 depends not only on the value of the current in this circuit, but also on the frequency. This arrangement may therefore be used, as will now be described in connection with Fig. 3, to just counterbalance the inductive voltage drop in the alternating current circuit, since this inductive voltage drop varies according to the same laws. It is well known that this compensation of the inductive voltage drop plays an important part in the exciter circuit of stator excited cascaded commutator machines of doubly-fed induction-motor sets.

Such an arrangement is shown in Fig. 3 of the drawing. Referring to this figure, a main asynchronous machine 12, whose speed is to be regulated, is fed from the mains 11, and is provided with a secondary circuit in which is connected a cascaded commutator machine 13 mechanically coupled with an asynchronous load machine 111, for the purpose of regulating the speed of the main machine. The commutator machine 13 is equipped with an exciting winding 16 on the stator member thereof, which is excited from the mains 11 through a regulating transformer 18 and through a frequency converter 14 which is mounted on the shaft of the main induction motor 12, and which converts the line frequency to slip frequency. Into the exciting circuit of the cascaded commutator machine, carrying slip frequency current, there is also inserted a specially constructed substantially reactionless current transformer 17, the secondary voltage of which is again converted to the line frequency by means of a second mechanically coupled frequency converter 15 and is then introduced into the secondary circuit of the regulating transformer 18. One of the frequency converters, as the converter 14, is furnished with a compensation winding 112.

By "reactionless," I mean that the current transformer 17 is so constructed that the reaction or effect of the secondary current on the primary current is substantially negligible as compared to the magnetizing current which always flows in the primary winding. In an ordinary current-transformer, the reaction effect is very nearly 100% strong, so that a very definite relation exists between the primary voltage and the secondary voltage, but in a reactionless current transformer, the primary voltage and current are scarcely affected at all by the secondary voltage and current. This is accomplished, obviously, by making the magnetizing ampere-turns so large that the secondary ampere-turns are very small in comparison, which can be easily brought about by providing an air gap in the transformer. By this means, a small amount of power, or volt-amperes, is derived from the current transformer 17, and this power, when properly converted in frequency, by means of the frequency converter 15, is fed, as exciting current, into the slip rings of the machine 14, which is, in effect, a commutator-type generator, deriving power from its shaft, which is also the shaft of the main induction motor 12, and supplying energy to the exciting winding circuit of the cascaded commutator machine 13, at a voltage proportional to the excitation current which was fed into the slip rings of the commutator-type generator 14. Since the current transformer 17 is reactionless, the phase of the secondary voltage thereof is always 90° displaced from the primary current, because the latter is substantially all magnetizing current; and the position of the commutator brushes of the converter 15 is so set that the component of exciting current supplied to the commutator-type generator 14 by the converter 15 is in such phase as to compensate for the reactance voltage drop of the exciting circuit of the cascaded machine 13 in which the current transformer 17 is connected. If the current transformer 17 were of the usual reaction type, there would be a fixed relation between the output current of the commutator-type generator 14, which flows in the primary side of the current transformer, and the quadrature component of the exciting current of the generator 14, which, in a converted form, flows in the secondary side of the transformer. This would make it impossible to regulate the output of the commutator-type generator 14 by means of the regulating transformer 18, and hence my reactionless transformer, or its equivalent, must be used somewhere in the circuits in order to make the apparatus effectively operative for the purpose specified.

To the slip rings of the frequency converter 14 are thus supplied one component, which is the secondary voltage of the regulating transformer 18 and a second component, in quadrature relation thereto, which is derived from the secondary voltage of the current transformer 17. The valve and the phase of the secondary voltage of the current transformer 17 are preferably so chosen that it neutralizes the inductive voltage drop resulting from the flow of the exciting current in the entire exciting circuit, and principally in the stator exciting winding 16 of the cascaded commutator machine, and in the primary winding of the current transformer 17.

On regulating the speed of the main induction machine 12 by altering the current in the exciting winding 16 of the cascaded commutator machine 13, only the voltage for covering the ohmic drop in the winding 16 is set by the adjustment of the regulating transformer 18. The voltage for covering the inductive voltage drop of the exciting winding circuit is then automatically supplied by the current transformer 17. One regulating apparatus is thus all that is necessary.

If the transformation-ratio of the current transformer 17 is not quite the exact amount required for the neutralization of the reactance voltages in its primary circuit, the speed of the asynchronous main machine 12 will be dependent, in some definite degree, upon the load. The current transformer 17 then acts as compounding transformer, supplying to the transformer 18 a voltage component either in phase or in phase opposition with the voltage generated by the transformer 18 itself.

In the system illustrated in Fig. 4 of the drawings, the two frequency converters 26 and 27 are mechanically coupled with a small auxiliary asynchronous motor 211, so that they run with a speed independent of the speed of the main asynchronous machine, which is of particular advantage in the case of slowly running asynchronous main machines, since, in the latter case, a gearing between the asynchronous main machine and the frequency converters is necessary because the commutator machines are essentially high-speed machines, becoming unwieldy in size if the rotational electromotive forces therein are small.

The main asynchronous machine 21 of Fig. 4 is regulated by means of a cascaded commutator machine 22 in such a manner that the output of the asynchronous machine is either completely independent of the slip or has any desired adjustable relation to the slip. In the first case the secondary voltage of the asynchronous machine is constantly neutralized by the voltage developed by the cascaded commutator machine, and the secondary current of the asynchronous machine is generated by a voltage introduced through the cascaded commutator machine independently of the slip. In the second case a certain adjustable fraction of the secondary voltage of the asynchronous machine is neutralized by the cascaded commutator machine. To attain this last-mentioned end, the stator exciter winding 23 of the cascaded commutator machine 22 is fed, in series connection, from a voltage proportional to the slip and from a voltage independent of the slip. The first voltage is supplied by an auxiliary winding in the secondary part of the main machine 21 through auxiliary slip rings 24. This voltage is transmitted, to the frequency converters 26 and 27 which energize the exciter winding 23, through a regulating transformer 25. The voltage independent of the slip is supplied from the line through a regulating transformer 28 and through a third frequency converter 29 which is mounted on the shaft of the main machine. For compensating the inductive voltage drop in the circuit of the exciting winding 23, a reactionless current transformer 210, similar, in function, to the current transformer 17 of Fig. 3, is connected in series with the two frequency converters 26 and 27 which supply current to the exciting winding 23. The two frequency converters 26 and 27 are driven by an asynchronous motor 211. The inductive voltage drop in the circuit of the exciting winding 23 is proportional to the strength of the exciting current and to the slip frequency. This relation also holds good for the secondary voltage in the current transformer 210, which is supplied, through the frequency converter 26, to the slip rings of the frequency converter 27 and thus to the exciting winding 23. The current transformer 210 and the frequency converters 26 and 27 are so dimensioned and adjusted in phase, that they neutralize the inductive voltage drop in the exciting winding 23. Of the two frequency converters 26 and 27 at least one, for example the converter 27, is provided with a compensation winding 112, as in Fig. 3.

The voltage of the current transformer 210 in Fig. 4 is also employed to compensate for the deviations of the commutator voltage of the cascaded machine 22 from the proper amount, owing to the speed variations of the main machine to which it is connected. This compensation or correction is needed because the commutator voltage of the cascaded machine 22 is proportional to the speed as well as to the strength of the exciting field or the exciting current in the stator field winding 23. To this end, the transformer 210 is built as an induction regulator, so that the phases of its secondary voltage may easily be adjusted in such a manner that it is composed of two components at right angles to one another, one of which covers the inductive voltage drop in the exciting circuit of the winding 23, and the other of which compensates for the influence of the speed variations of the cascaded commutator machine 22.

The regulation process in the main machine 21 is disturbed by stray voltages generated by the load current in the secondary winding thereof, particularly when the regulation is set for constant output independent of the slip. To neutralize the effect of these stray voltages, a second current transformer 212 is provided, the primary winding of which is connected in the main secondary circuit of the main machine 21 and the secondary winding of which is electrically coupled in series circuit relation to the exciting winding 23 of the cascaded machine, as by being connected in the secondary circuit of the first-mentioned current transformer 210, as shown in Fig. 4.

The stray voltages caused by the secondary load current induce also a disturbing voltage in the auxiliary secondary winding connected to the slip rings 24. To neutralize this voltage, therefore, a third current transformer 213 is provided, having a primary winding which is connected in the main secondary circuit of the main machine 21, and having a secondary winding which is connected in the circuit of the said auxiliary secondary winding. This current transformer 213 is for the purpose of introducing a voltage component proportional to the slip in the main secondary winding of the main asynchronous machine.

The two transformers 212 and 213 oppose each other and thus produce the effect of a single transformer connected between the main secondary circuit of the main machine 21 and the circuit of the auxiliary secondary winding which is connected to the slip rings 24.

Since the inductive voltage drop in the exciting circuit of the cascaded commutator machine 22 is constantly and automatically neutralized, the voltages acting on the exciting circuit and supplied by the two regulating transformers 25 and 28 have to cover the ohmic voltage drop only. This ohmic voltage drop is, however, very small. The regulation by means of the transformers 25 and 28 is therefore difficult and not in sufficiently fine steps, since it is not easy to construct tapping transformers for fine step regulation for very low voltages. To improve the regulation, ohmic resistances 214 are, therefore, connected in the circuit of the exciting winding 23. These resistors 214 raise the regulating voltages to be supplied by the transformers 25 and 28 to any extent desired. The ohmic resistances 214 may themselves be regulable and may then be made use of for the regulation, for instance the regulation in fine steps.

The frequency converter 26 in Fig. 4 is typical of any machine having a slip frequency carrying winding connected to the secondary side of the current transformer 210, while a second winding, with higher frequency, feeds the slip rings of the frequency converter 27. The current transformer 210 and the frequency converter 26 together perform the function of deriving a voltage responsive to the exciting current and the frequency of the cascaded commutator machine 22 and supplying a proportionate high-frequency voltage to the slip rings of the frequency converter 27.

The arrangement illustrated in Fig. 4 has the further advantage, that the transformers 212 and 213 and in particular the regulating transformer 25 are very small, since they do not feed the exciting winding 23 directly but merely excite the frequency converter 27 which feeds the exciting winding 23. Since the main frequency converter 27 is equipped with a compensating winding, the other frequency converter 26 has to supply only the exciting KVA of the main frequency converter 27, which amounts to about 30% of the KVA output of said main frequency converter. The size of the transformers 25, 212 and 213 may be still further reduced by providing the main frequency converter 27 with a stator exciter winding 216 which is connected in shunt across the commutator of the converter by means of an extra set of brushes thereon, as shown. The exciting KVA which has to be supplied to the rotor of the frequency converter 27 through the slip rings is thus reduced to a fraction of the total excitation of the machine. In series with the stator exciting winding 216 there are connected ohmic resistances 215 of sufficient magnitude to avoid a direct current self-excitation.

The current transformers 210, 212 and 213 are preferably designed as reactionless transformers, as hereinabove explained in connection with the current transformer 17 of Fig. 3. In this way, they introduce the desired voltages into their secondary circuits, but there is practically no reaction or reflection of the secondary current upon the primary circuit. To secure this result, the transformers are constructed with large air gaps, so that they take up large magnetizing currents. For adjusting the correct phase of the various voltages, one or more of the said transformers 210, 212 and 213 may furthermore be designed as induction regulators, as has already been mentioned in connection with the transformer 210, the neutralization of the reaction being attained in particularly simple manner by utilizing an extraordinarily large width of air gap therein.

Figure 5:
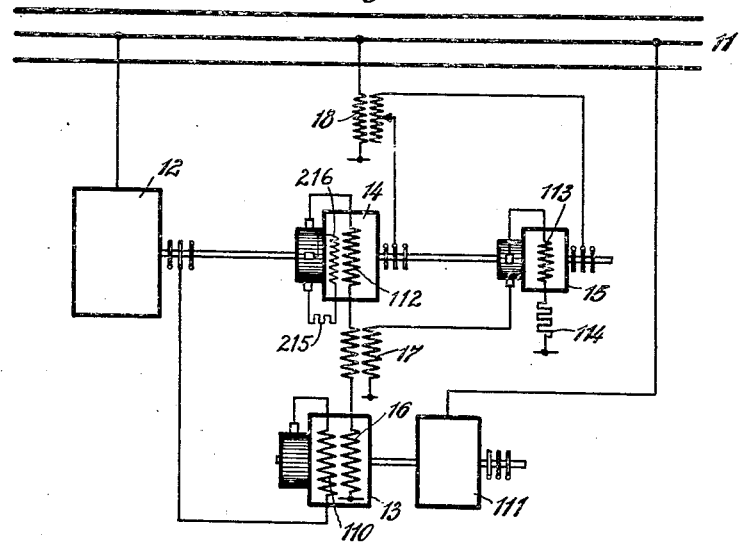

Fig. 5 of the drawings illustrates a further improvement of the system shown in Fig. 3, in which at least one of the frequency converters 14 and 15 (in particular the one without the compensation winding 112) is provided with stator exciter windings connected to the commutator. It is thus necessary to supply a considerably smaller rotor exciting KVA to the slip rings of the frequency converter 15 thus equipped, because said converter now becomes a generator, drawing power from the shaft, so that the current transformer 17 need give off only a correspondingly smaller secondary output, resulting in a corresponding reduction in the size of the transformer. In this figure, 12 is again the main asynchronous machine the speed of which is to be regulated; and 13 is the cascaded commutator machine provided with the slip frequency exciting winding 16 in the stator. It is excited from the transformator 18 connected to the line 11, through the frequency converter 14. For neutralizing the inductive voltage drop in the circuit of the exciting winding 16, there is provided the current transformer 17, the secondary voltage of which is supplied to the transformer 18 after being transformed by the second frequency converter 15. The frequency converter 14 is provided with a compensation winding 112 in the stator. The frequency converter 15, which, in the Fig. 3 arrangement, was without a winding in the stator, is now equipped with the shunt exciting winding 113 in the stator, which is fed from the commutator. The exciting KVA supplied to the second converter from the secondary winding of the current transformer 17 now amounts to only a small fraction of the KVA supplied to the transformer 18 by the frequency converter 15.

In the circuit of the shunt exciting winding 113 of the converter 15 there are also connected ohmic resistances 114, which serve both to prevent a direct current self-excitation and to prevent phase displacement of the exciting current when the slip frequency is varied.

As indicated in Figs. 5 and 6, a further reduction in the size of the current transformer 17 may be attained by providing the frequency converter 14 with a shunt-connected stator exciter winding circuit similar to the winding 216 and the resistors 215 previously described in connection with Fig. 4.

In the systems according to Figs. 3 to 5 the induction voltage in the compensating winding 112 of one of the frequency converters exercises a somewhat detrimental action on the accurate neutralization of the induction countervoltage in the variable frequency circuit (such as the exciting circuit of the cascaded commutator machine) to which currents are supplied by said frequency converters. This induction voltage in the compensating winding 112 is proportional both to the current in the circuit of variable frequency and to the square of the variable frequency. For neutralizing the influence of this induction voltage an auxiliary current transformer 19 is provided, as shown in the Figs. 6 and 7, the primary winding of which is connected in the circuit of the secondary winding of the first current transformer 17 and the secondary winding of which feeds a stator exciter winding $110^a$ on the frequency converter 15 through an ohmic resistance 123.

The arrangement of Fig. 6 is otherwise substantially the same as that in Fig. 3.

Inasmuch as the transformer 17 supplies mainly wattless secondary current, and inasmuch as the frequency converters 14 and 15 are only slightly saturated, the secondary current of the transformer 17 is proportional to its secondary voltage, i. e. proportional to the exciting current in the primary winding of the transformer 17 and proportional to the slip frequency therein. The secondary voltage of the transformer 19 is thus proportional to the said exciting current in the exciting winding 16, and is also proportional to the square of the slip frequency therein. A voltage following the same law as the induction voltage of the compensating winding 112 is thus supplied, through the converter 15, to the slip rings of the frequency converter 14, and there it neutralizes the influence of the induction voltage of the compensation winding 112.

Fig. 7 of the drawing shows a modified system in which the smaller, or exciting, frequency converter 15 of the previous figures is constructed as an ordinary asynchronous or induction machine 124. This frequency converter 124 is equipped with two stator windings 115 and 110ª, which are connected to the secondary windings of the transformers 17 and 19 across the ohmic resistances 116 and 123, respectively. The two stator windings 110ª and 115 generate certain voltages in the rotor of the asynchronous machine 124 and thus also, through the converter 14, in the circuit of the exciting winding 16; said voltages having a component which is proportional to the exciting current in the exciting winding 16, and to the slip frequency thereof, so that it neutralizes the inductive voltage drop in the circuit of said exciting winding 16; said voltages also having a component which while the second is proportional to the exciting current and to the square of the slip frequency thereof, so that it neutralizes the voltage induced in the compensation winding 112.

Various modifications and changes may be made without departing from the spirit and the scope of the invention, and I desire, therefore, that only such limitations shall be placed thereon as are imposed by the prior art.

I claim as my invention:

1. In combination, an alternating current circuit, a frequency converter having a high-frequency side and a low-frequency side, means for connecting one side of said frequency converter in said alternating current circuit, a second frequency converter also having a high-frequency side and a low-frequency side, means for connecting one side of said second frequency converter to the second side of the first-mentioned frequency converter, and means for supplying the second side of said second frequency converter with a control voltage, characterized by the fact that at least one of said frequency converters is a commutator machine provided with a compensating winding and a mechanical driving means for said compensated machine.

2. In combination, an alternating current circuit, a frequency converter having a high-frequency side and a low-frequency side, means for connecting one side of said frequency converter in said alternating current circuit, a second frequency converter mechanically coupled to said first-mentioned frequency converter and having a high-frequency side and a low-frequency side, means for connecting one side of said second frequency converter to the second side of said first frequency converter, an impedance device connected in said alternating current circuit, and means for deriving a voltage from said impedance device and supplying the same to the second side of said second frequency converter, characterized by the fact that at least one of said frequency converters is a commutator machine provided with a compensation winding.

3. In combination, an alternating current circuit, a frequency converter having a high-frequency side and a low-frequency side, means for connecting one side of said frequency converter in said alternating current circuit, a second frequency converter mechanically coupled to said first-mentioned frequency converter and having a high-frequency side and a low-frequency side, means for connecting one side of said second frequency converter to the second side of said first frequency converter, an inductance device connected in said alternating current circuit, and means for deriving a voltage from said inductance device and supplying the same to the second side of said second frequency converter characterized by the fact that at least one of said frequency converters is a commutator machine provided with compensation winding.

4. In combination, an alternating current circuit of variable frequency, a frequency converter having a high-frequency side and a low-frequency side, means for connecting one side of said frequency converter in said alternating current circuit, a second frequency converter mechanically coupled to said first-mentioned frequency converter and having a high-frequency side and a low-frequency side, means for connecting one side of said second frequency converter to the second side of said first frequency converter, an impedance device connected in said alternating current circuit, and means for deriving a voltage from said impedance device and supplying the same to the second side of said second frequency converter, characterized by the fact that at least one of said frequency converters is a commutator machine provided with a compensation winding.

5. In combination, an alternating current circuit of variable frequency, a frequency converter having a high-frequency side and a low-frequency side, means for connecting one side of said frequency converter in said alternating current circuit, a second frequency converter mechanically coupled to said first-mentioned frequency converter and having a high-frequency side and a low-frequency side, means for connecting one side of said second frequency converter to the second side of said first frequency converter, a current transformer connected in said alternating current circuit, and means for applying the secondary voltage of said transformer to the second side of said second frequency converter, characterized by the fact that at least one of said frequency converters is a commutator machine provided with a compensating winding.

6. In combination, an alternating current circuit of variable frequency, a frequency converter having a high-frequency side and a low-frequency side, means for connecting one side of said frequency converter in said alternating current circuit, a second frequency converter mechanically coupled to said first-mentioned frequency converter and having a high-frequency side and a low-frequency side, means for connecting one side of said second frequency converter to the second side of said first frequency converter, a substantially reactionless current transformer connected in said alternating current circuit, and means for applying the secondary voltage of said reactionless transformer to the second side of said second frequency converter, characterized by the fact that at least one of said frequency converters is a commutator machine provided with a compensating winding.

7. In combination, an asynchronous machine, a cascaded commutator machine connected in circuits feeding the secondary winding of said asynchronous machine, said cascaded commutator machine having a stator excting winding, a frequency converter having a high-frequency side and a low-frequency side, means for connecting one side of said frequency converter in the exciting winding circuit of the cascaded commutator machine, a second frequency converter mechanically coupled to said first-mentioned frequency converter and having a high-frequency side and a low-frequency side, means for connecting one side of said second frequency converter to the second side of said first frequency converter, an impedance device connected in the circuit of the exciting winding of said cascaded commutator machine, and means for deriving a voltage from the impedance device and applying the same to the second side of the said second frequency converter, characterized by the fact that at least one of said frequency converters is a commutator machine provided with a compensation winding.

8. In combination, an asynchronous machine, a cascaded commutator machine connected in circuits feeding the secondary winding of said asynchronous machine, said cascaded commutator machine having a stator exciting winding, a frequency converter having a high-frequency side and a low-frequency side, means for connecting one side of said frequency converter in the exciting winding circuit of the cascaded commutator machine, a second frequency converter mechanically coupled to said first-mentioned frequency converter and having a high-frequency side and a low-frequency side, means for connecting one side of said second frequency converter to the second side of said first frequency converter, a current transformer connected in the circuit of the exciting winding of said cascaded commutator machine, and means for applying the secondary voltage of said transformer to the second side of said frequency converter, characterized by the fact that at least one of said frequency converters is a commutator machine provided with a compensation winding.

9. In combination, an asynchronous machine, a cascaded commutator machine connected in the secondary circuit of said asynchronous machine, said cascaded commutator machine having a stator exciting winding, a frequency converter having a high-frequency side and a low-frequency side, means for connecting one side of said frequency converter in the exciting winding circuit of said cascaded commutator machine, a second frequency converter mechanically coupled to the said first-mentioned frequency converter, and having a high-frequency side and a low-frequency side, a regulating transformer, the primary side of the regulating transformer being connected to the primary circuit of the said asynchronous machine, electric connections between the second side of the first frequency converter and one side of the second frequency converter, the secondary winding of said regulating transformer being included in the last-mentioned connections, a current transformer having primary and secondary windings, the primary winding of said current transformer being connected in the exciting winding circuit of said cascaded commutator machine, and means for applying the secondary voltage of said current transformer to the second side of the second frequency converter, characterized by the fact that at least one of said frequency converters is a commutator machine provided with a compensating winding.

10. In combination, an asynchronous machine, a cascaded commutator machine connected in circuits fed from the secondary winding of said asynchronous machine, said cascaded commutator machine having a stator exciting winding, a frequency converter having a high-frequency side and a low-frequency side, means for connecting one side of said frequency converter in the exciting winding circuit of said cascaded commutator machine, a second frequency converter mechanically coupled to said first-mentioned frequency converter and having a high-frequency side and a low-frequency side, said frequency converters including, between them, at least one compensating winding, the machine carrying the said compensating winding being a commutator machine, means for connecting the second side of said first frequency converter to one side of the second frequency converter, a main current transformer having a primary circuit connected in the exciting winding circuit of said cascaded commutator machine, and having a secondary circuit connected to the second side of said second frequency converter, said second frequency converter having an auxiliary stator exciting winding, and an auxiliary current transformer having a primary side connected in the secondary circuit of the said main current transformer, and having a secondary side connected to said auxiliary stator exciter winding of the said second frequency converter.

11. In combination, an asynchronous machine, a cascaded commutator machine connected in circuits fed from the secondary winding of said asynchronous machine, said cascaded commutator machine having a stator exciting winding, a commutator frequency converter having one side connected in the exciting winding circuit of said cascaded commutator machine, a second commutator frequency converter mechanically coupled to the said first-mentioned commutator frequency converter, means for connecting the second side of said first frequency converter to one side of the second frequency converter, at least one of said frequency converters having a stator exciting winding connected to its own commutator, an impedance device in the exciting winding circuit of said cascaded commutator machine, and means for deriving a voltage from this impedance device and applying the same to the second side of said second frequency converter.

12. The combination with a main polyphase wound induction motor, of a cascaded commutator machine having polyphase commutator brushes connected in series circuit relation to the secondary windings of said main induction motor, and having a stator neutralizing winding and a stator exciting winding, and means whereby torque is delivered to, or absorbed from, the shaft of said cascaded commutator machine, characterized by having a regulating apparatus for energizing said stator exciting winding of said cascaded commutator machine as follows: a commutator-type generator comprising a commutator circuit, a stator neutralizing circuit and an exciting circuit, the last-mentioned commutator and neutralizing circuits being serially connected to each other and to the stator exciting winding of said cascaded commutator machine, and a source of regulable exciting currents for the exciting circuit of said commutator-type generator, said source comprising two component serially related sources, one of said component sources being inherently responsive to the currents in said stator exciting winding of said cascaded commutator machine and being operative to automatically produce a component of excitation substantially exactly such as is necessary to compensate for the induction voltage drop in the circuit of said stator exciting winding of said cascaded commutator machine at all times, and the other of said component sources including a regulating line-frequency transformer, an auxiliary frequency converter in series with one of said component serially related sources so as to supply, to the exciting circuit of said commutator-type generator, a single resultant exciting voltage having the proper exciting frequency and having the two component parts above described, said component parts being substantially quadrature related, and a common driving connection for said commutator-type generator and said auxiliary frequency converter.

13. The combination with a main polyphase wound induction motor, of a cascaded commutator machine having polyphase commutator brushes connected in series circuit relation to the secondary windings of said main induction motor, and having a stator neutralizing winding and an exciting circuit, and means whereby torque is delivered to, or absorbed from, the shaft of said cascaded commutator machine, characterized by having a regulating apparatus for energizing said exciting circuit of said cascaded commutator machine as follows: two commutator-type frequency converters having a common driving connection, each of said frequency converters having a line-frequency slip-ring side and a slip-frequency commutator side, at least one of said frequency converters being provided with a neutralizing winding in series with the slip-frequency side, an independently variable voltage source of fixed-frequency voltages having a fixed phase position with respect to the line voltage which is applied to the primary windings of said main induction motor, an automatically variable voltage source of exciting-frequency voltages having a fixed phase position, and a fixed proportion, to the exciting currents in the exciting circuit of said cascaded commutator machine, energizing connections between the output side of the first of said frequency converters and said exciting circuit of said cascaded commutator machine, connections between the input side of said first frequency converter and the output side of the second of said frequency converters, connections between the input side of said second frequency converter and said automatically variable source of voltages in such phase relation that the resultant voltage component appearing in the output side of said first frequency converter has substantially the precise phase and magnitude needed at all times for neutralizing the inductance voltage drops in the exciting circuit of the cascaded commutator machine, and means for introducing the said independently variable source of voltages so as to appear in substantially quadrature relation to the voltage components from said automatically variable source in the input side of said first frequency converter.

14. The combination with a main polyphase wound induction motor, of a cascaded commutator machine having polyphase commutator brushes connected in series circuit relation to the secondary windings of said main induction motor, and having a stator neutralizing winding and a stator exciting winding, and means whereby torque is delivered to, or absorbed from, the shaft of said cascaded commutator machine, characterized by having a regulating apparatus for energizing said stator exciting winding of said cascaded commutator machine as follows: two commutator-type frequency converters having a common driving connection, each of said frequency converters having a line-frequency slip-ring side and a slip-frequency commutator side, at least one of said frequency converters being provided with a neutralizing winding in series with the slip-frequency side, an independently variable voltage source of line-frequency voltages having a fixed phase position with respect to the line voltage which is applied to the primary windings of said main induction motor, an automatically variable voltage source of slip-frequency voltages having a fixed phase position, and a fixed proportion, to the slip-frequency exciting currents in the stator exciting winding of said cascaded commutator machine, energizing connections between the commutator side of the first of said frequency converters and said stator exciting winding of said cascaded commutator machine, connections between the slip-ring side of said first frequency converter and the slip-ring side of the second of said frequency converters, connections between the commutator side of said second frequency converter and said automatically variable source of voltages in such phase relation that the resultant voltage component appearing in the commutator side of said first frequency converter has substantially the precise phase and magnitude needed at all times for neutralizing the inductance voltage drops in the stator exciting winding circuit of the cascaded commutator machine, and means for introducing the said independently variable source of voltages so as to appear in substantially quadrature relation to the voltage components from said automatically variable source in the slip-ring side of said first frequency converter.

15. The invention as set forth in claim 12, characterized by the fact that said inherently operating current-responsive source includes a substantially reactionless current transformer.

16. The invention as set forth in claim 13, characterized by the fact that said automatically variable voltage source includes a substantially reactionless current transformer.

17. The invention as set forth in claim 14, characterized by the fact that said automatically variable voltage source includes a substantially reactionless current transformer.

18. The invention as set forth in claim 14, characterized by the fact that at least one of said frequency converters has a shunt-connected stator exciting winding connected across its commutator side.

In testimony whereof, I have hereunto subscribed my name this 12th day of April, 1928, at Berlin-Siemensstadt, Germany.

MICHAEL LIWSCHITZ.